(12) United States Patent
Jalkanen et al.

(10) Patent No.: US 12,341,359 B2
(45) Date of Patent: Jun. 24, 2025

(54) APPARATUS, SYSTEM AND METHOD FOR COMMUNICATING DATA

(71) Applicant: Nokia Technologies Oy, Espoo (FI)

(72) Inventors: Jukka Mikael Jalkanen, Helsinki (FI); Michel Rene Gustave Ghislain Gillet, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 268 days.

(21) Appl. No.: 16/959,308

(22) PCT Filed: Jan. 3, 2019

(86) PCT No.: PCT/EP2019/050083
§ 371 (c)(1),
(2) Date: Jun. 30, 2020

(87) PCT Pub. No.: WO2019/141519
PCT Pub. Date: Jul. 25, 2019

(65) Prior Publication Data
US 2021/0057923 A1 Feb. 25, 2021

(30) Foreign Application Priority Data
Jan. 16, 2018 (EP) .................... 18151939

(51) Int. Cl.
*H02J 7/00* (2006.01)
*G06F 1/04* (2006.01)
*H02J 50/80* (2016.01)

(52) U.S. Cl.
CPC ............ *H02J 7/00034* (2020.01); *G06F 1/04* (2013.01); *H02J 50/80* (2016.02)

(58) Field of Classification Search
CPC .................................................. H02J 7/0042
See application file for complete search history.

(56) References Cited

U.S. PATENT DOCUMENTS 6,341,229 B1 * 1/2002 Akiva ............... A61B 5/282
600/536
7,176,655 B2 * 2/2007 Kogan ............... G06F 1/1635
320/112
(Continued)

FOREIGN PATENT DOCUMENTS

CN 106356952 A * 1/2017
CN 107094174 A 8/2017
(Continued)

OTHER PUBLICATIONS

Huang CN-106356952 translation (Year: 2017).*
(Continued)

*Primary Examiner* — Tynese V McDaniel
(74) *Attorney, Agent, or Firm* — ALSTON & BIRD LLP

(57) ABSTRACT

An apparatus (10) configured to be connectable to a first electronic device (12) and a second electronic device (14). The apparatus comprises: a memory (16); a rechargeable battery (18); a real time clock (20); and engagement means. The engagement means is configured to releasably hold the apparatus in engagement with the first electronic device (12) to establish a first physical communication link between the apparatus (10) and the first electronic device (12). The engagement means is configured to releasably hold the apparatus in engagement with the second electronic device (14) to establish a second physical communication link between the apparatus (10) and the second electronic device (14). When held in engagement with the second electronic device (14) the apparatus (10) is configured to receive current time data from the second electronic device via the second physical communication link for storage in the real time clock (20), and recharge the rechargeable battery by the second electronic device (14). When subsequently held in engagement with the first electronic device (12) the apparatus (10) is configured to transmit current time data to the (Continued)

Figure 5:
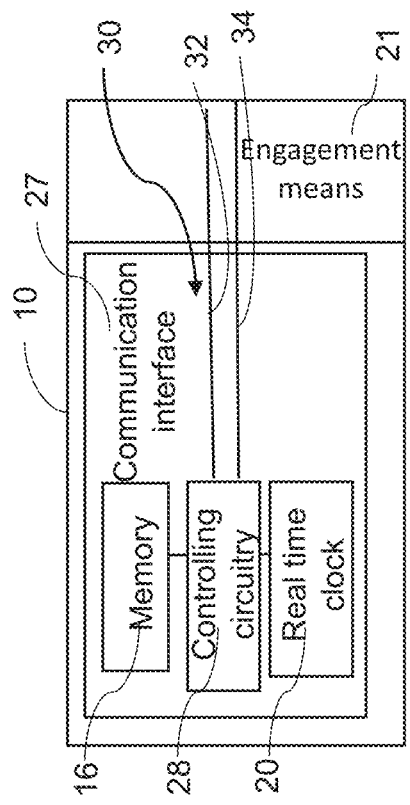

first electronic device (12) via the first physical communication link, receive data collected by the first electronic device (12) via the first physical communication link for storage in the memory (16), and power the first electronic device with the rechargeable battery (18).

19 Claims, 12 Drawing Sheets

(56) References Cited

U.S. PATENT DOCUMENTS

| | | | |
|---|---|---|---|
| 7,658,613 B1* | 2/2010 | Griffin | H01R 13/6205 439/39 |
| 9,685,802 B1* | 6/2017 | Mirov | H02J 7/0044 |
| 2005/0017679 A1* | 1/2005 | Tashiro | H02J 7/00047 320/112 |
| 2005/0077869 A1* | 4/2005 | Yueh | H02J 7/342 320/114 |
| 2006/0120518 A1* | 6/2006 | Baudino | H04L 67/306 379/91.02 |
| 2006/0145663 A1* | 7/2006 | Shiff | H01R 13/6205 320/125 |
| 2006/0288165 A1* | 12/2006 | Rosenbloom | H04L 67/06 711/115 |
| 2009/0113093 A1* | 4/2009 | Chen | H01R 31/06 340/636.2 |
| 2009/0276547 A1* | 11/2009 | Rosenblatt | F01N 3/2073 710/33 |
| 2010/0036993 A1* | 2/2010 | Kular | G06F 1/26 710/313 |
| 2010/0127856 A1* | 5/2010 | Sipple | G08B 21/24 340/540 |
| 2010/0192141 A1* | 7/2010 | Fisher | G01R 33/28 710/305 |
| 2010/0267250 A1* | 10/2010 | Schiff | H01R 13/6205 439/39 |
| 2011/0023130 A1 | 1/2011 | Gudgel et al. | |
| 2012/0200173 A1* | 8/2012 | Liu | G06F 1/266 307/130 |
| 2012/0206090 A1* | 8/2012 | Hyun-Jun | H02J 7/025 439/39 |
| 2012/0295451 A1* | 11/2012 | Hyun-Jun | H01R 13/6205 439/39 |
| 2013/0143419 A1* | 6/2013 | Wei | H04M 1/0274 439/39 |
| 2013/0222614 A1* | 8/2013 | Takagi | H04L 7/0008 370/503 |
| 2013/0236192 A1* | 9/2013 | Deicke | H02J 50/80 398/135 |
| 2014/0113461 A1* | 4/2014 | Kim | H01R 13/6205 439/39 |
| 2014/0187896 A1* | 7/2014 | Banet | A61B 5/6822 600/382 |
| 2014/0187897 A1* | 7/2014 | Banet | A61B 5/25 600/382 |
| 2014/0187974 A1* | 7/2014 | Banet | A61B 5/25 600/483 |
| 2014/0187976 A1* | 7/2014 | Banet | A61B 5/0006 600/484 |
| 2014/0187990 A1* | 7/2014 | Banet | A61B 5/029 600/509 |
| 2014/0220793 A1* | 8/2014 | Yen | H01R 13/6205 439/39 |
| 2014/0235977 A1* | 8/2014 | Banet | A61B 5/0205 600/324 |
| 2014/0235979 A1* | 8/2014 | Banet | A61B 5/14552 600/324 |
| 2014/0236027 A1* | 8/2014 | Banet | A61B 5/0205 600/484 |
| 2014/0236031 A1* | 8/2014 | Banet | A61B 5/029 600/513 |
| 2014/0236037 A1* | 8/2014 | Banet | A61B 5/1126 600/536 |
| 2014/0281139 A1* | 9/2014 | Smurthwaite | H05K 5/0278 361/679.32 |
| 2014/0363988 A1* | 12/2014 | An | G06F 1/1632 439/39 |
| 2015/0081944 A1* | 3/2015 | An | H01R 31/06 710/313 |
| 2015/0112151 A1* | 4/2015 | Muhsin | A61B 5/002 600/301 |
| 2015/0199684 A1* | 7/2015 | Maus | H04L 67/12 705/71 |
| 2015/0359429 A1* | 12/2015 | Al-Ali | A61B 5/7405 600/300 |
| 2016/0064854 A1* | 3/2016 | Schooley | H01R 31/06 439/39 |
| 2016/0091922 A1* | 3/2016 | Nazzaro | G06F 1/163 307/104 |
| 2016/0126768 A1* | 5/2016 | Fust | G06F 13/385 710/63 |
| 2016/0291550 A1* | 10/2016 | Chen | H01M 10/46 |
| 2016/0301238 A1* | 10/2016 | Khoshvenis | H02J 7/0047 |
| 2016/0336775 A1* | 11/2016 | Cho | H02J 7/0042 |
| 2017/0090530 A1* | 3/2017 | Filser | H02J 1/084 |
| 2017/0172423 A1* | 6/2017 | Banet | A61B 5/7275 |
| 2017/0172515 A1* | 6/2017 | Banet | A61B 5/029 |
| 2017/0366028 A1* | 12/2017 | Nicholson | H04L 12/10 |
| 2018/0090890 A1* | 3/2018 | Kallman | H01R 13/745 |
| 2018/0132744 A1* | 5/2018 | Yu | A61B 5/318 |
| 2019/0288519 A1* | 9/2019 | Takei | G06F 1/266 |
| 2019/0289211 A1* | 9/2019 | Asakura | H04N 5/3698 |
| 2019/0290134 A1* | 9/2019 | Banet | A61B 5/14552 |
| 2020/0029874 A1* | 1/2020 | Tang | G16H 40/67 |
| 2021/0361164 A1* | 11/2021 | Bogdan | A61B 5/746 |
| 2021/0391620 A1* | 12/2021 | Porter | G02B 27/017 |
| 2021/0401299 A1* | 12/2021 | Banet | A61B 5/1117 |

FOREIGN PATENT DOCUMENTS

| | | |
|---|---|---|
| EP | 2631722 A2 | 8/2013 |
| JP | H0210189 A | 1/1990 |

OTHER PUBLICATIONS

"QIUB: Power Bank, cable, memory All-in-1 Pocket Size", Indiegogo, Retrieved on Jun. 30, 2020, Webpage available at : https://www.indiegogo.com/projects/qiub-power-bank-cable-memory-all-in-1-pocket-size#/.

Extended European Search Report received for corresponding European Patent Application No. 18151939.8, dated Jun. 27, 2018, 19 pages.

International Search Report and Written Opinion received for corresponding Patent Cooperation Treaty Application No. PCT/EP2019/050083, dated Apr. 1, 2019, 24 pages.

Oral Proceedings received for corresponding European Patent Application No. 18151939.8, dated Sep. 15, 1 2021, 18 pages.

Office Action received for corresponding European Patent Application No. 18151939.8, dated Mar. 26, 2021, 11 pages.

* cited by examiner

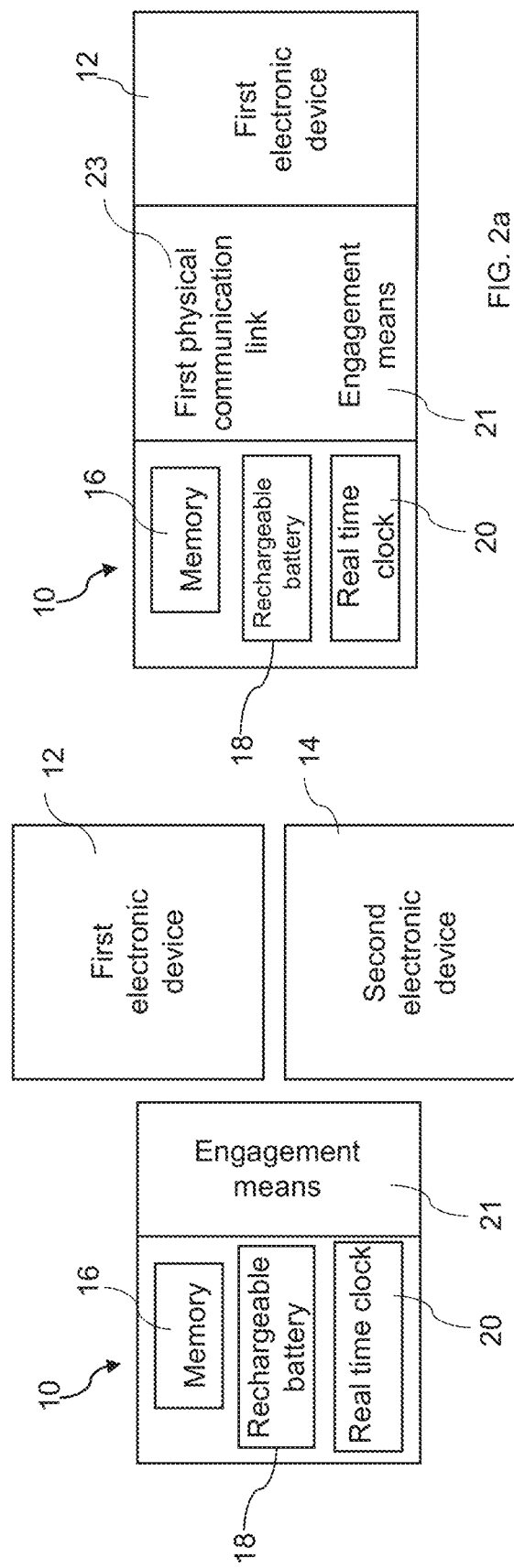

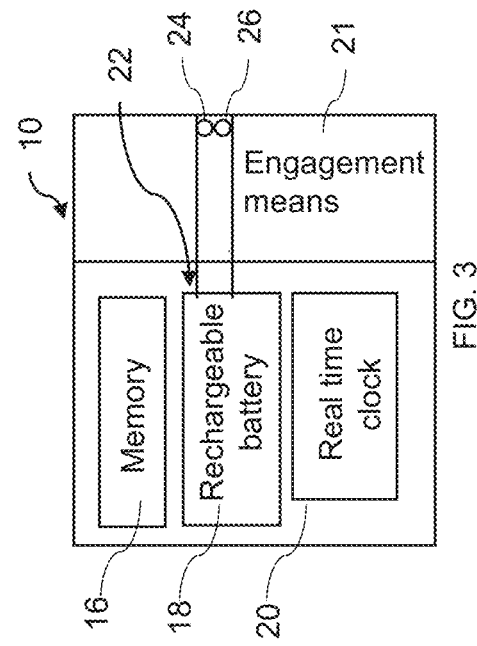
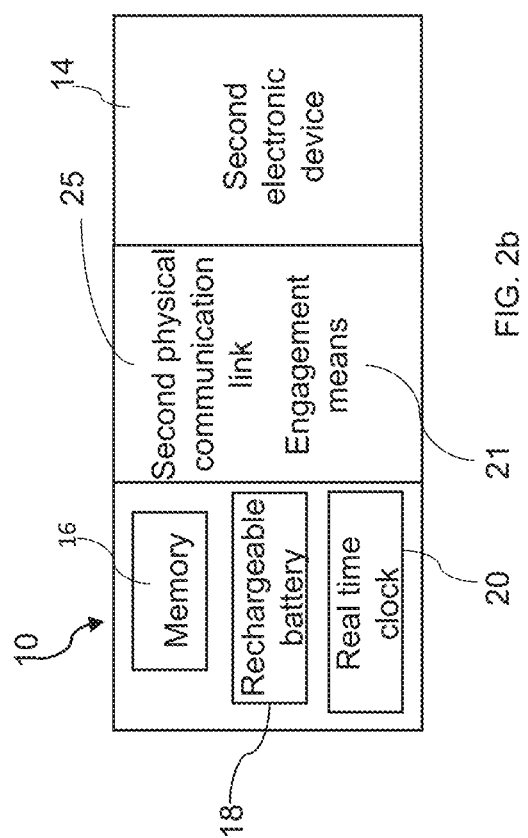

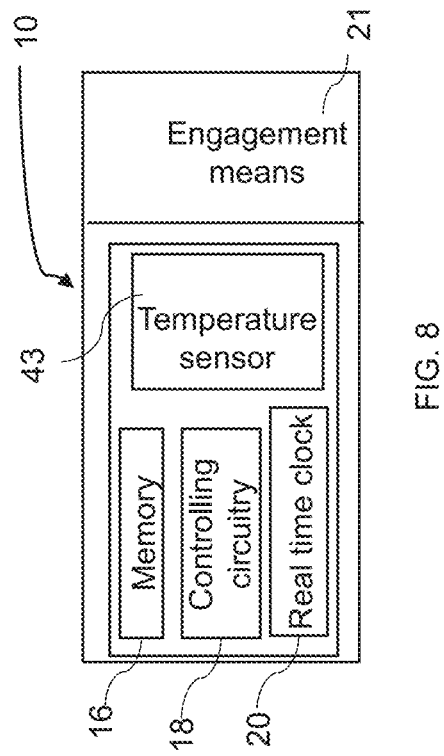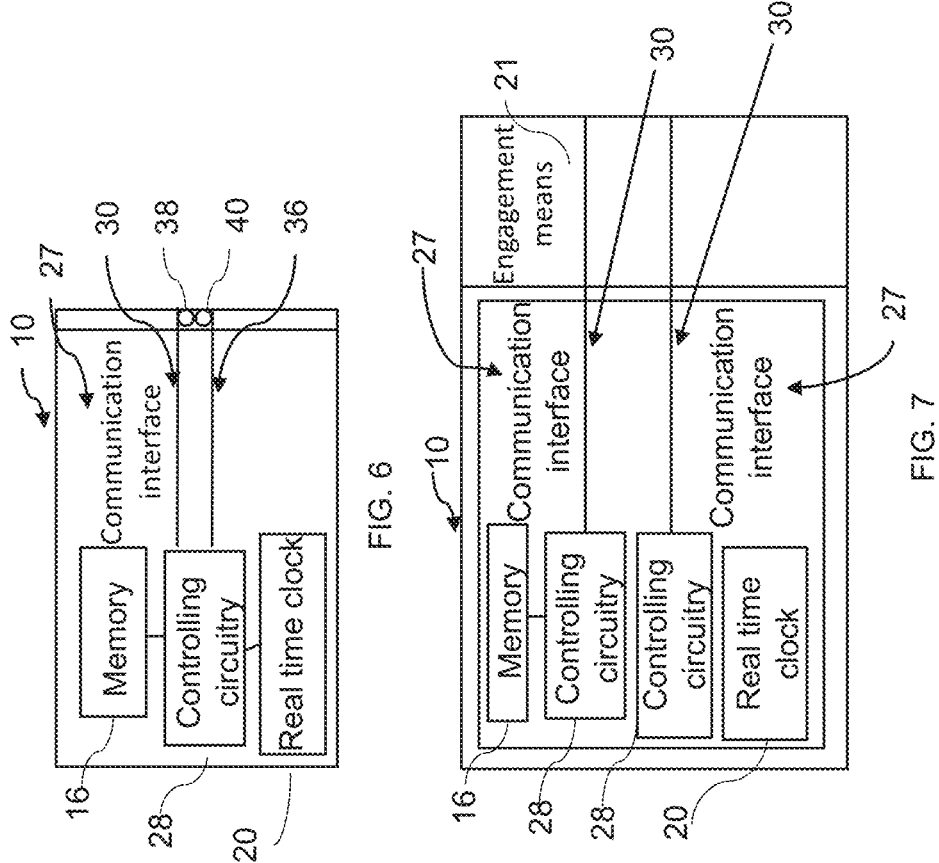

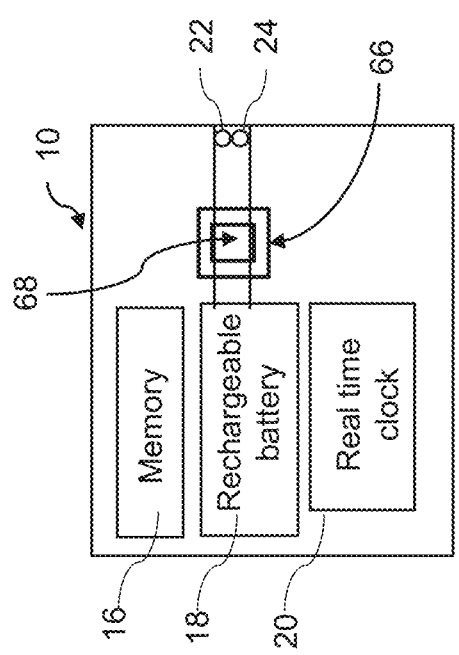
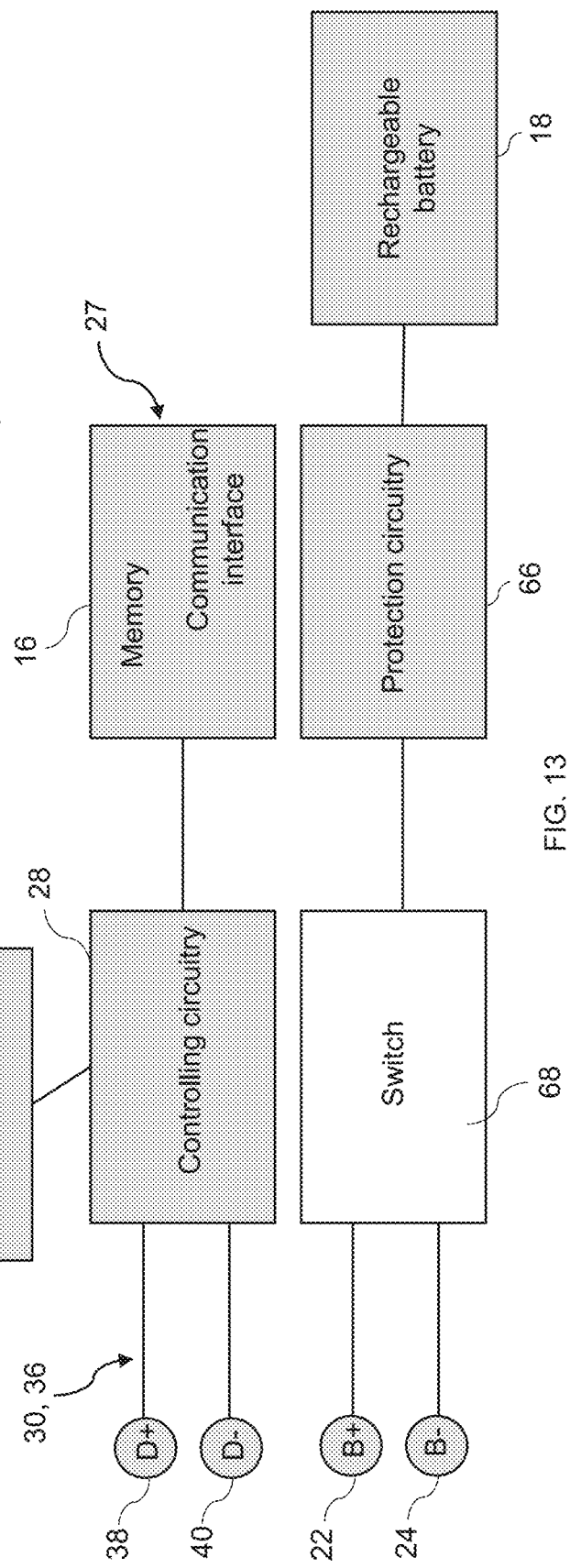
FIG. 12
FIG. 13

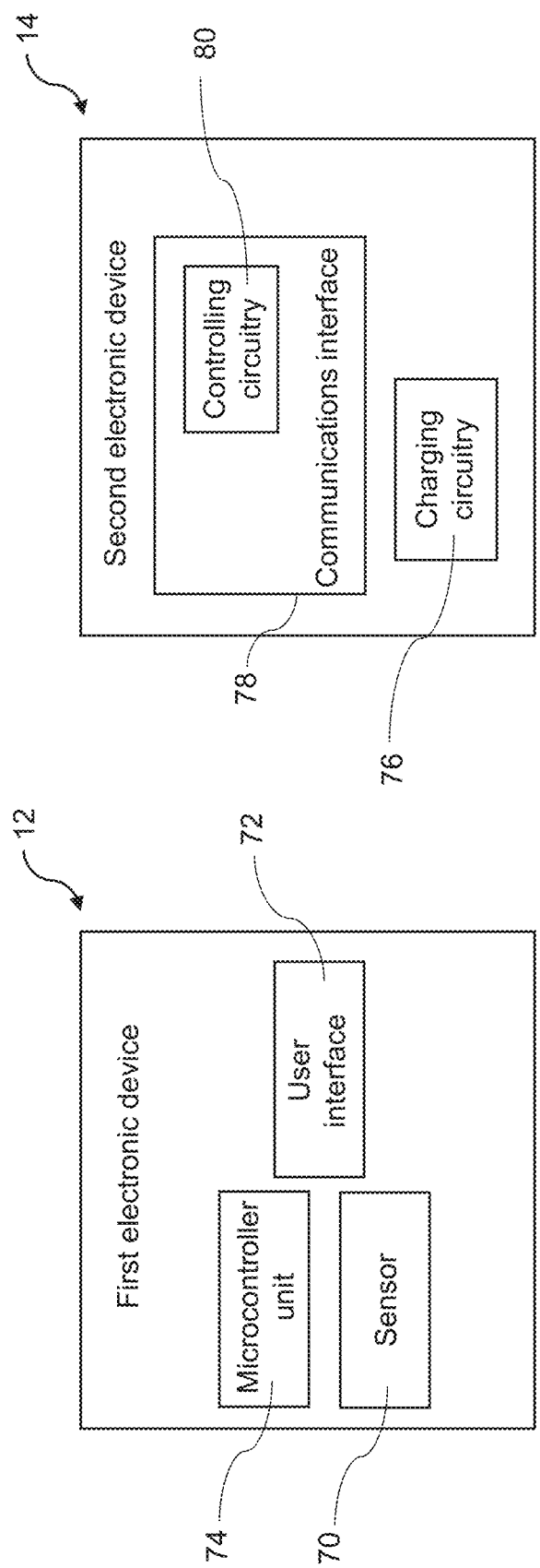

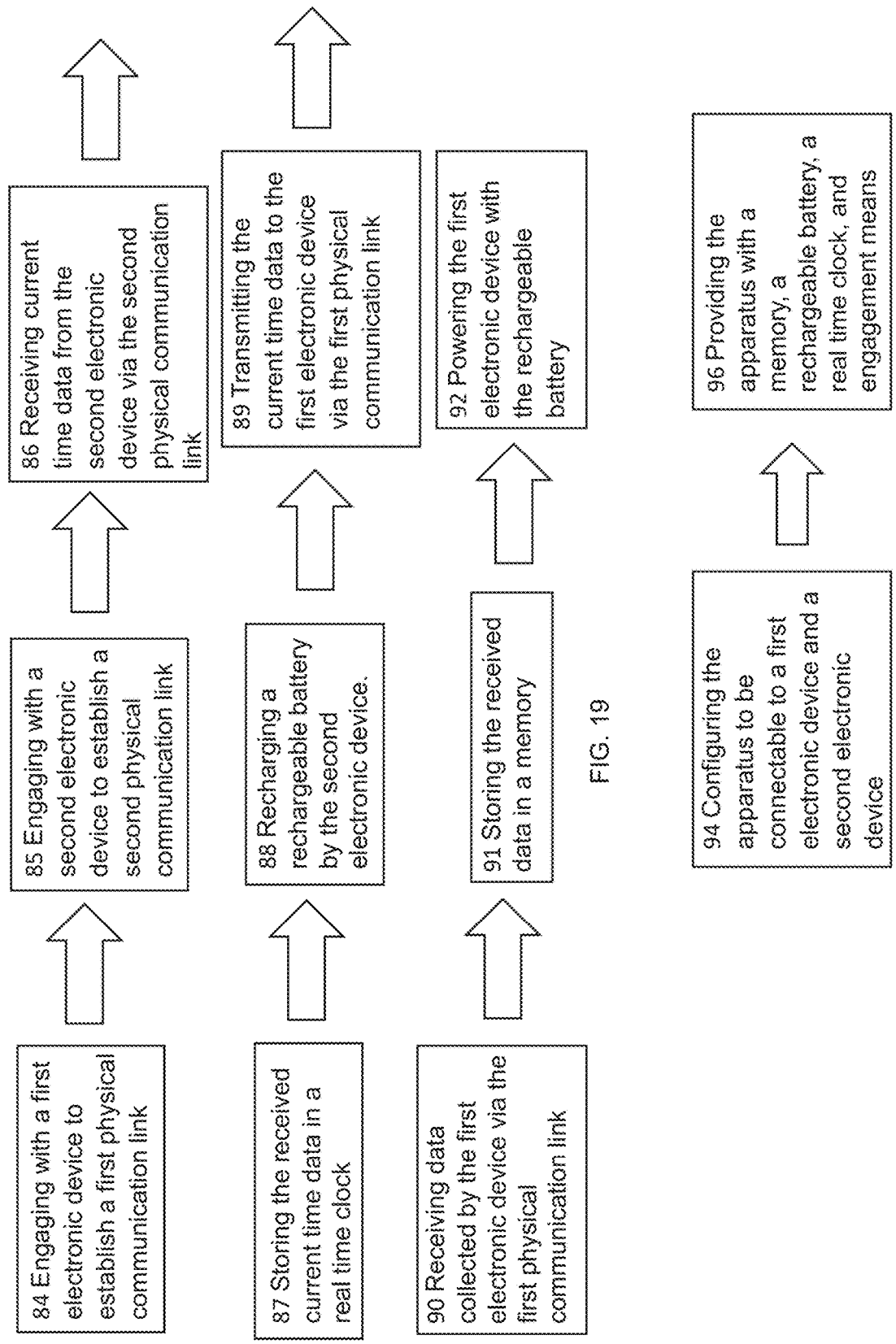

APPARATUS, SYSTEM AND METHOD FOR COMMUNICATING DATA

RELATED APPLICATION

This application claims priority to PCT Application No. PCT/EP2019/050083, filed on Jan. 3, 2019, which claims priority to European Application No. 18151939.8, filed on Jan. 16, 2018, each of which is incorporated herein by reference in its entirety.

TECHNOLOGICAL FIELD

Examples of the disclosure relate to an apparatus, system and method for communicating data, and in particular for communicating data via a physical communication link.

BACKGROUND

Communication of data between electronic devices may require wireless communication of data between the electronic devices, which increases the size and battery usage of such electronic devices.

There is a requirement therefore to provide apparatus, systems and methods which permit data to be communicated between electronic devices via a physical communication link.

BRIEF SUMMARY

According to various, but not necessarily all, examples of the disclosure there is provided an apparatus configured to be connectable to a first electronic device and a second electronic device, wherein the apparatus comprises:
 a memory;
 a rechargeable battery;
 a real time clock; and
 engagement means configured to:
  releasably hold the apparatus in engagement with the first electronic device to establish a first physical communication link, between the apparatus and the first electronic device; and
  releasably hold the apparatus in engagement with the second electronic device to establish a second physical communication link, between the apparatus and the second electronic device;
 wherein the apparatus is configured to:
  when held in engagement with the second electronic device, receive current time data from the second electronic device via the second physical communication link for storage in the real time clock, and recharge the rechargeable battery by the second electronic device; and
  when subsequently held in engagement with the first electronic device, transmit the current time data to the first electronic device via the first physical communication link, receive data collected by the first electronic device via the first physical communication link for storage in the memory, and power the first electronic device with the rechargeable battery.

The apparatus may comprise a communication interface configured to communicate with the respective first and second electronic devices, wherein the communication interface comprises controlling circuitry, the memory and the real time clock.

The controlling circuitry may be configured to receive data from the first electronic device via the first physical communication link for storage in the memory, and to transmit data stored in the memory to the second electronic device via the second physical communication link. The controlling circuitry may be configured to receive the current time data from the second electronic device via the second physical communication link for storage in the real time clock, and to transmit the current time data to the first electronic device via the first physical communication link. The controlling circuitry may comprise a Bus multiplexer.

The engagement means may comprise a mating surface configured to mate with a corresponding mating surface on the respective first and second electronic devices. The engagement means may be configured to releasably hold the apparatus in engagement with the first or second electronic devices by a magnetic field.

The apparatus may comprise protection circuitry comprising a magnetic switch, wherein the switch is configured to control electrical connection to the battery terminals. The magnetic switch may be configured such that when the apparatus is releasably held in engagement with the first or second electronic devices by a magnetic field, the switch connects the battery terminals enabling the rechargeable battery, wherein when the apparatus is disengaged from the first or second electronic devices the switch disconnects the battery terminals disabling the rechargeable battery.

Possibly, the apparatus does not comprise RF circuitry.

According to various, but not necessarily all, examples of the disclosure there is provided an apparatus configured to be connectable to an electronic device, wherein the apparatus is configured to be releasably held by engagement means of the electronic device to establish a physical communication link between the apparatus and the electronic device;
 wherein the apparatus is configured to:
  when held in engagement with the electronic device, transmit data to the electronic device via the physical communication link, receive current time data from the electronic device via the physical communication link, and be powered by a rechargeable battery of the electronic device.

The apparatus may be configured to be wearable by a subject. The apparatus may be configured to monitor a physiological parameter of a subject. Possibly, the apparatus does not comprise a real time clock. Possibly, the apparatus does not comprise RF circuitry.

According to various, but not necessarily all, examples of the disclosure there is provided an apparatus configured to be connectable to an electronic device, wherein the apparatus is configured to be releasably held by engagement means of the electronic device to establish a physical communication link between the apparatus and the electronic device;
 wherein the apparatus is configured to:
  when held in engagement with the electronic device, transmit the current time data to the electronic device via the physical communication link, and to recharge a rechargeable battery of the electronic device.

The apparatus may be configured to communicate with one or more remote devices.

According to various, but not necessarily all, examples of the disclosure there is provided a system, the system comprising:
 an apparatus, the apparatus comprising: a memory, a rechargeable battery, a real time clock, and engagement means;
 a first electronic device;
 a second electronic device;

wherein the engagement means is configured to:
releasably hold the apparatus in engagement with the first electronic device to establish a first physical communication link, between the apparatus and the first electronic device; and
releasably hold the apparatus in engagement with the second electronic device to establish a second physical communication link, between the apparatus and the second electronic device;
wherein the apparatus is configured to:
when held in engagement with the second electronic device, receive current time data from the second electronic device via the second physical communication link for storage in the real time clock, and recharge the rechargeable battery by the second electronic device; and
when subsequently held in engagement with the first electronic device, transmit the current time data to the first electronic device via the first physical communication link, receive data collected by the first electronic device via the first physical communication link for storage in the memory, and power the first electronic device with the rechargeable battery.

Possibly, the apparatus and the first electronic device do not comprise RF circuitry.

According to various, but not necessarily all, examples of the disclosure there is provided a method comprising:
engaging with a first electronic device to establish a first physical communication link;
engaging with a second electronic device to establish a second physical communication link;
receiving current time data from the second electronic device via the second physical communication link;
storing the received current time data in a real time clock;
recharging a rechargeable battery by the second electronic device;
transmitting the current time data to the first electronic device via the first physical communication link;
receiving data collected by the first electronic device via the first physical communication link;
storing the received data in a memory;
powering the first electronic device with the rechargeable battery.

According to various, but not necessarily all, examples of the disclosure there is provided a method comprising:
configuring an apparatus to be connectable to a first electronic device and a second electronic device.
providing the apparatus with a memory; a rechargeable battery; a real time clock; and engagement means.

According to various, but not necessarily all, examples of the disclosure there is provided a computer program comprising computer program instructions that, when executed by processing circuitry of an apparatus, perform:
determining an engagement of the apparatus with a first electronic device and an establishment of a first physical communication link between the apparatus and the first electronic device;
determining an engagement of the apparatus with a second electronic device and an establishment of a second physical communication link between the apparatus and the second electronic device;
receiving current time data from the second electronic device via the second physical communication link;
storing the received current time data in a real time clock;
recharging a rechargeable battery by the second electronic device;
transmitting the current time data to the first electronic device via the first physical communication link;
receiving data collected by the first electronic device via the first physical communication link;
storing the received data in a memory;
powering the first electronic device with the rechargeable battery.

According to various, but not necessarily all, examples of the disclosure there may be provided examples as claimed in the appended claims.

BRIEF DESCRIPTION

Figure 4:
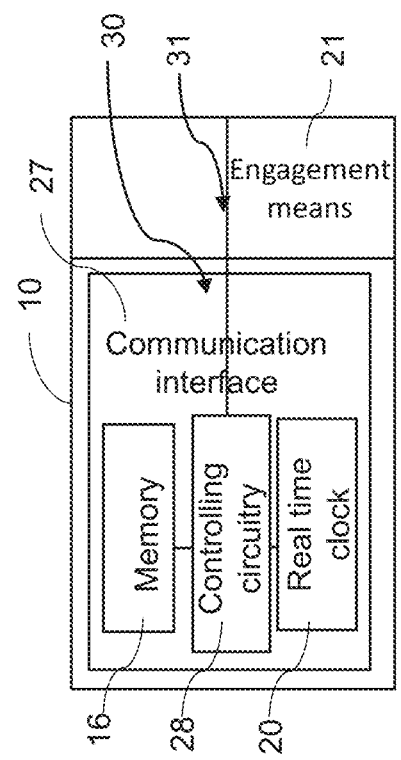
Figure 9:
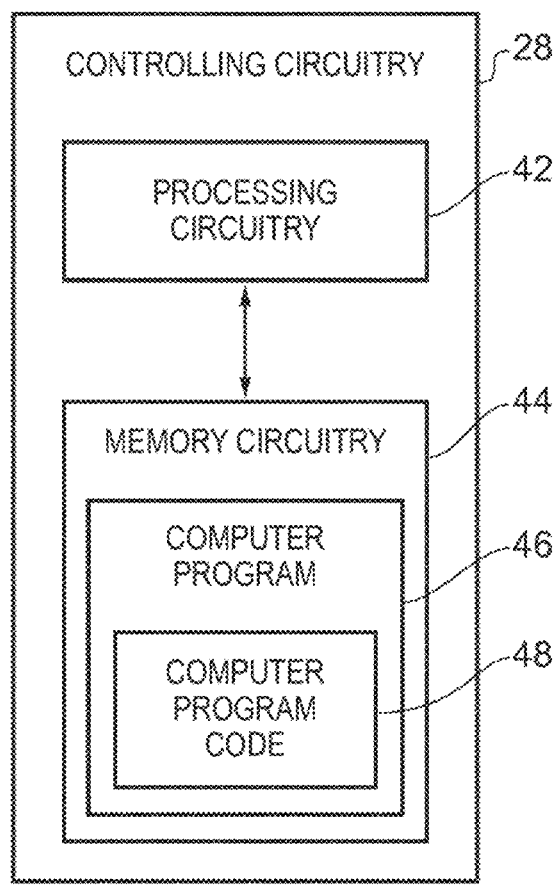
Figure 10:
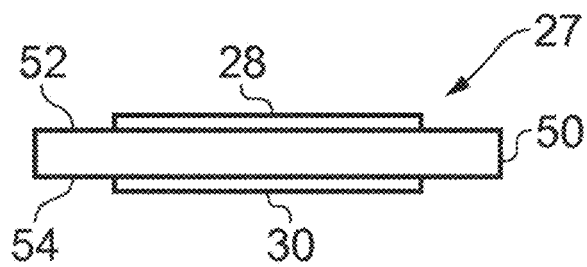
Figure 11:
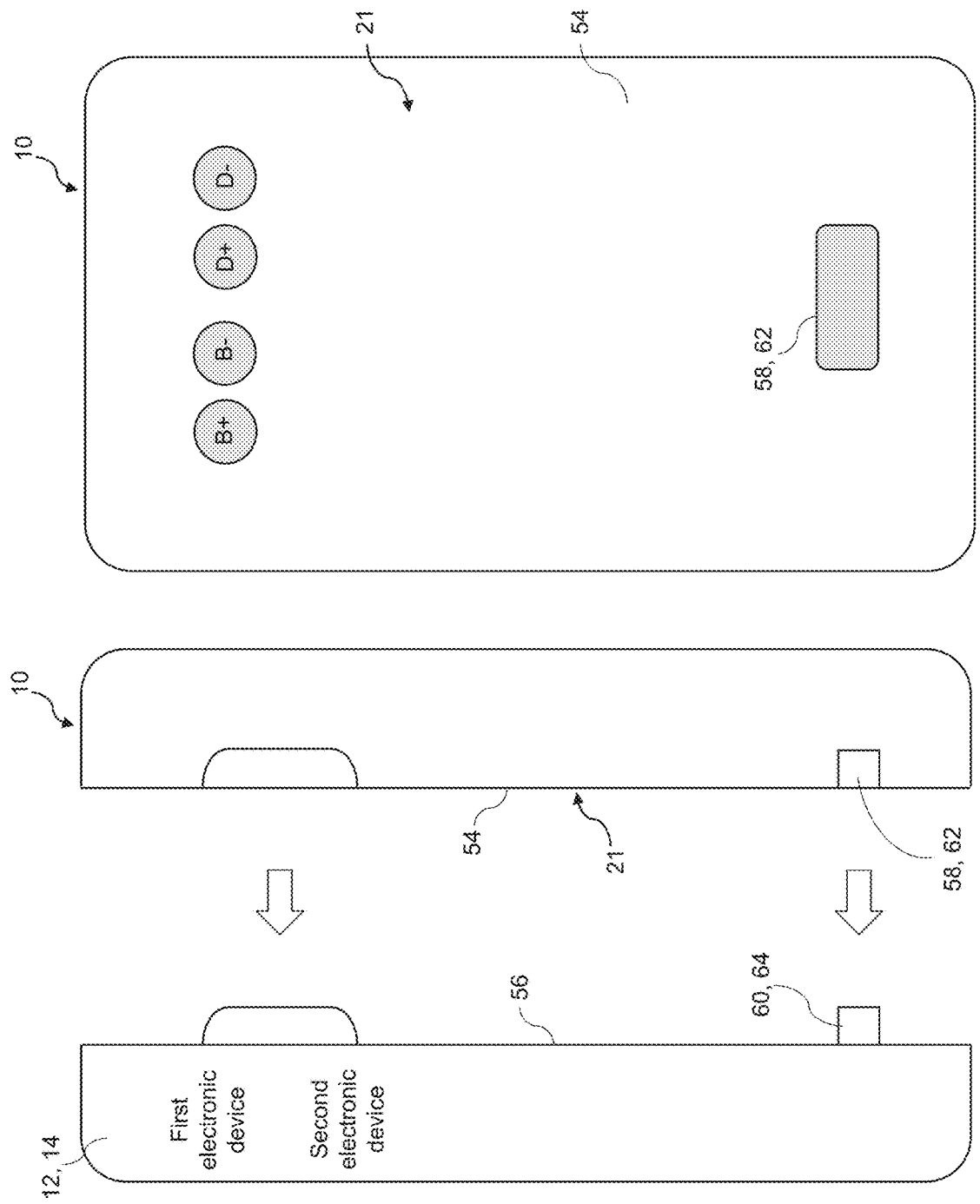
Figure 16:
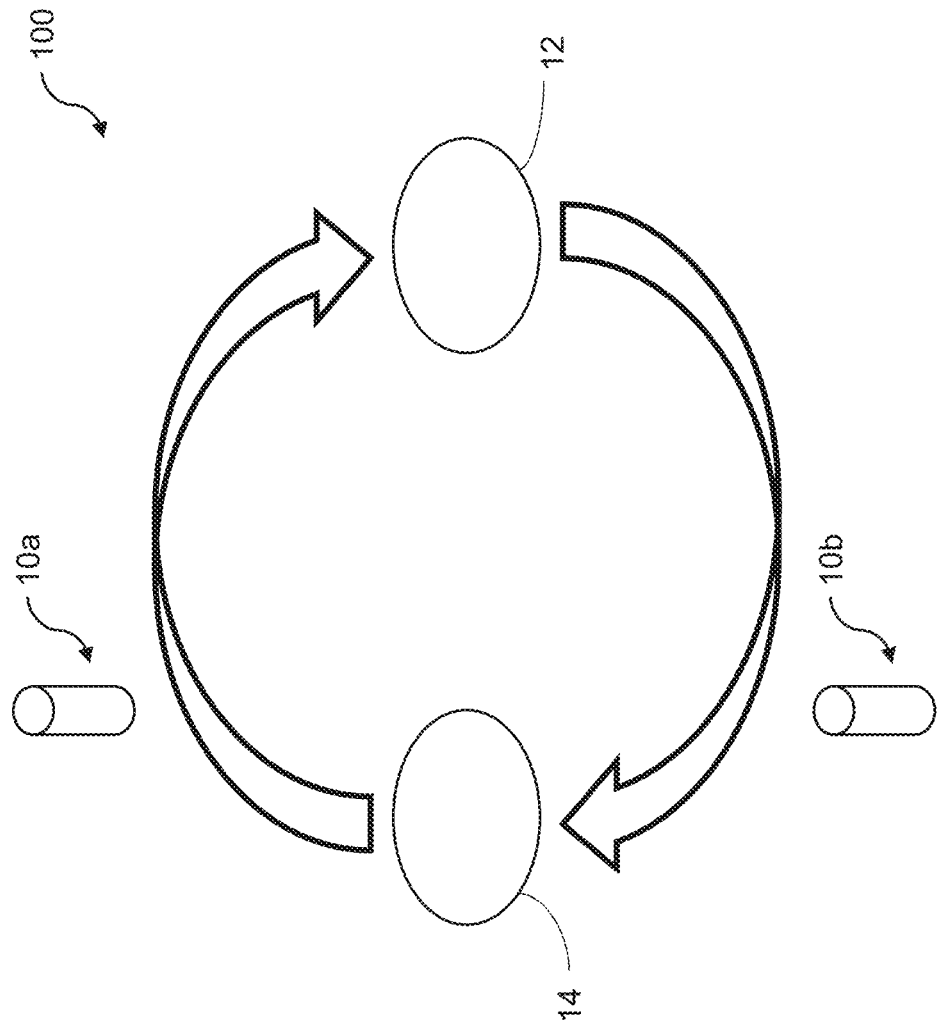
Figure 17:
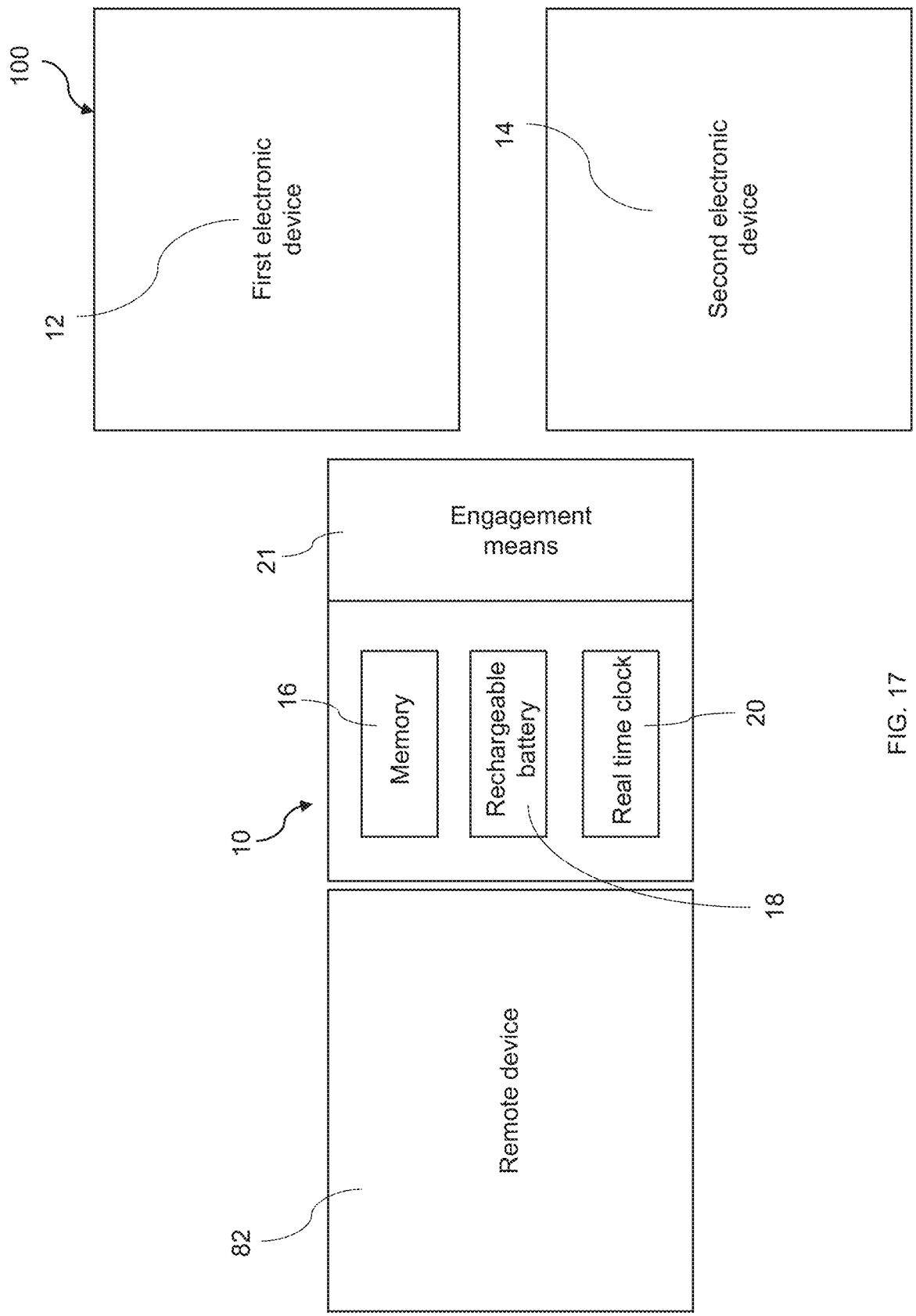
Figure 18:
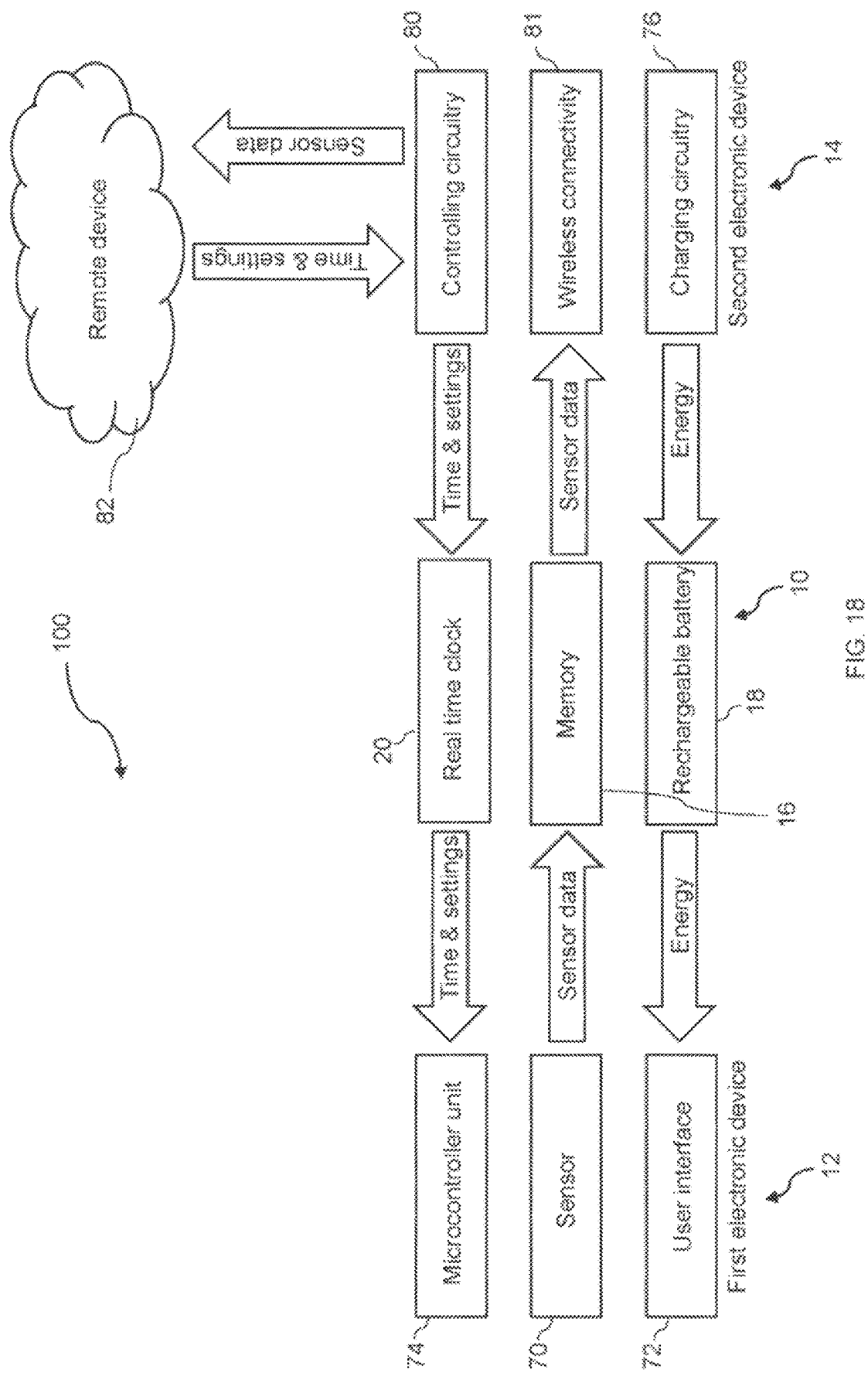

For a better understanding of various examples that are useful for understanding the detailed description, reference will now be made by way of example only to the accompanying drawings in which:
FIG. 1 illustrates an example apparatus;
FIG. 2 illustrates the example of FIG. 1 in use;
FIG. 3 illustrates another example apparatus;
FIG. 4 illustrates another example apparatus;
FIG. 5 illustrates another example apparatus;
FIG. 6 illustrates another example apparatus;
FIG. 7 illustrates another example apparatus;
FIG. 8 illustrates another example apparatus;
FIG. 9 illustrates controlling circuitry;
FIG. 10 illustrates another example apparatus;
FIG. 11 illustrates another example apparatus;
FIG. 12 illustrates another example apparatus;
FIG. 13 illustrates another example apparatus;
FIG. 14 illustrates a first electronic device;
FIG. 15 illustrates a second electronic device;
FIG. 16 illustrates a system;
FIG. 17 illustrates another system;
FIG. 18 illustrates another system;
FIG. 19 illustrates a method; and
FIG. 20 illustrates another method.

DETAILED DESCRIPTION

The figures illustrate an apparatus 10, system 100, and methods according to examples of the disclosure.

FIG. 1 illustrates an apparatus 10 configured to be connectable to a first electronic device 12 and a second electronic device 14. The apparatus 10 comprises: a memory 16; a rechargeable battery 18; a real time clock 20; and engagement means 21.

As illustrated in FIG. 2a, the engagement means 21 is configured to releasably hold the apparatus 10 in engagement with the first electronic device 12 to establish a first physical communication link 23 between the apparatus 10 and the first electronic device 12.

As illustrated in FIG. 2b, the engagement means 21 is also configured to releasably hold the apparatus 10 in engagement with the second electronic device 14 to establish a second physical communication link 25 between the apparatus 10 and the second electronic device 14.

When held in engagement with the second electronic device 14, the apparatus 10 is configured to: receive current time data from the second electronic device 14 via the second physical communication link 25 for storage in the real time clock 20, and recharge the rechargeable battery 18 by the second electronic device 14.

When subsequently held in engagement with the first electronic device 12, the apparatus 10 is configured to: transmit the current time data to the first electronic device 12 via the first physical communication link 23, receive data collected by the first electronic device 12 via the first physical communication link 23 for storage in the memory 16, and power the first electronic device 12 with the rechargeable battery 18.

In some examples, when held in engagement with the second electronic device 14, the apparatus 10 is configured to transmit the received data collected by the first electronic device 12 to the second electronic device 14 via the second physical communication link 25.

The second electronic device 14 may be configured to check the status of the rechargeable battery 18 to determine the level of charge, and to only charge the rechargeable battery 18 if it is determined that the rechargeable battery 18 is not fully charged. Accordingly, a fully charged rechargeable battery 18 would not be further charged by the second electronic device 14.

In some examples, the apparatus 10 does not comprise radio frequency (RF) circuitry. RF circuitry is not required because the apparatus 10 communicates with the respective first and second electronic devices 12, 14 via respective first and second physical communication links 23, 25. The absence of RF circuitry improves battery life and allows a more compact design of the apparatus 10.

In use, the rechargeable battery 18 is operatively coupled respectively to the first and second electronic devices 12, 14.

In some examples, the memory 16 is a solid state memory, and may be a flash memory. The memory 16 may be a non-volatile memory. The memory 16 may be a multimedia card (MMC), and may be an embedded multimedia card (eMMC). The memory 16 may be a secure digital card (SD).

The rechargeable battery 18 may comprise a lithium polymer battery, and may comprise a lithium iron phosphate battery.

As illustrated in FIG. 3, the apparatus 10 comprises an electrical connection 22, the electrical connection 22 comprising battery terminals 24, 26 for supplying power from the rechargeable battery 18 to the first electronic device 12, and for supplying power to the rechargeable battery 18 from the second electronic device 14 to recharge the rechargeable battery 18. The battery terminals 22, 24 comprise positive 22 and negative 24 contacts.

The real time clock 20 is configured to be powered by the rechargeable battery 18. The real time clock 20 comprises an integrated circuit. In use, the real time clock 20 provides the first electronic device 12 with current time data indicating the current time via the first physical communication link 23. The current time data provides timing information. The first electronic device 12 does not therefore require a real time clock.

Accordingly, the current time data of the first electronic device 12 can be set without any user interaction. Furthermore, the current time data is not wirelessly transmitted from the apparatus to the first electronic device 12. Accordingly, the first electronic device 12 does not require RF circuitry. The absence of RF circuitry allows a more compact design of the first electronic device 12, and reduces battery usage.

As illustrated in FIG. 4, in some examples the apparatus 10 comprises a communication interface 27 configured to communicate with the respective first and second electronic devices 12, 14. In some examples, the communication interface 27 comprises controlling circuitry 28, the memory 16 and the real time clock 20.

The controlling circuitry 28 is configured to transmit data to, and receive data from, the first electronic device 12 via the first physical communication link 23. The controlling circuitry 28 is configured to transmit data to, and receive data from, the second electronic device 12 via the second physical communication link 25.

The controlling circuitry 28 is configured to receive data from the first electronic device 12 via the first physical communication link 23 for storage in the memory 16, and to transmit data stored in the memory 16 to the second electronic device 14 via the second physical communication link 25. The controlling circuitry 28 is configured to receive the current time data from the second electronic device 14 via the second physical communication link 25 for storage in the real time clock 20, and to transmit the current time data to the first electronic device 12. The controlling circuitry 28 may also be configured to receive device setting data from the second electronic device 14, and to transmit device setting data to the first electronic device 12 via the first physical communication link 23.

The controlling circuitry 28 may comprise a multiplexer, and may comprise a Bus multiplexer. The controlling circuitry 28 may comprise a microcontroller unit, or may comprise a field-programmable gate array. The controlling circuitry 28 may comprise a Serializer/Deserializer (SerDes). The SerDes may be optimized for a connection of up to three centimetres. The controlling circuitry 28 may comprise an Inter-Integrated Circuit ($I^2C$) bus comprising two signals: SCL and SDA. The controlling circuitry 28 may comprise a synchronous serial communication interface, which may comprise a serial peripheral interface Bus (SPI).

The communication interface 27 comprises transmissions means 30 through which data can be transmitted and received via the respective first and second physical communication links 23, 25.

In some examples, for instance as illustrated in FIG. 4, the transmissions means 30 comprises a line 31 through which data can be both transmitted and received. In other examples, for instance as illustrated in FIG. 5, the transmissions means 30 comprises respective first and second lines 32, 34, wherein data is transmitted through the first line 32 and received through the second line 34.

As illustrated in FIG. 6, the transmission means 30 may comprise a differential pair transmission line 36, wherein the line is configured to transmit and receive data as low voltage differential line coding. The transmission means 30 may comprise two contacts 38, 40 for data transmission.

As illustrated in FIG. 7, in some examples of the disclosure the apparatus 10 comprises a first communication interface 27 comprising controlling circuitry 28 and the memory 16, and a second communication interface 27 comprising controlling circuitry 28 and the real time clock 20.

The controlling circuitry 28 of the respective first and second communication interface 27 is configured to transmit data to, and receive data from, the first electronic device 12 via the first physical communication link 23. The controlling circuitry 28 is configured to transmit data to, and receive data from, the second electronic device 12 via the second physical communication link 25.

The controlling circuitry 28 of the first communication interface 27 is configured to receive data from the first electronic device 12 via the first physical communication link 23 for storage in the memory 16, and to transmit data stored in the memory 16 to the second electronic device 14 via the second physical communication link 25. The controlling circuitry 28 of the first communication interface 27 is configured to receive device setting data from the second electronic device 14 via the second physical communication link 25, and to transmit device setting data to the first electronic device 12 via the first physical communication link 23.

The controlling circuitry 28 of the second communication interface 26 is configured to receive the current time data from the second electronic device 14 via the second physical communication link 25 for storage in the real time clock 20, and to transmit the current time data to the first electronic device 12 via the first physical communication link 23.

The respective first and second communication interfaces 27 also comprise transmissions means 30 through which data can be transmitted and received.

The controlling circuitry 28 of the first communication interface 27 may comprise I²C. The controlling circuitry 28 of the second communication interface 27 may comprise a field-programmable gate array, which may be a low power field-programmable gate array.

The controlling circuitry 28 may be configured to encrypt data stored in the memory 16.

As illustrated in FIG. 8, the apparatus 10 may also comprise a temperature sensor 43 for monitoring the temperature of the rechargeable battery 18. The controlling circuitry 28 may be configured to transmit data regarding the temperature of the rechargeable battery 18 to the respective first or second electronic devices 12, 14 via the respective first and second physical communication links 23, 25.

FIG. 9 illustrates other example controlling circuitry 28 which may be provided within the example apparatus 10. As illustrated in FIG. 9, the controlling circuitry 28 may comprise processing circuitry 42 and memory circuitry 44. The processing circuitry 42 may be configured to read from and write to the memory circuitry 44. The processing circuitry 42 may comprise one or more processors. The processing circuitry 42 may also comprise an output interface via which data and/or commands are output by the processing circuitry 42 and an input interface via which data and/or commands are input to the processing circuitry 42.

The memory circuitry 44 may be configured to store a computer program 46 comprising computer program instructions (computer program code) that controls the operation of the controlling circuitry 28 when loaded into processing circuitry 42. The computer program instructions, of the computer program 46, provide the logic and routines that enable the controlling circuitry to perform methods according to examples of the disclosure. The controlling circuitry 28 by reading the memory circuitry 44 is able to load and execute the computer program 46.

The computer program 46 may arrive at the controlling circuitry 28 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program. The delivery mechanism may be a signal configured to reliably transfer the computer program 46. The controlling circuitry 28 may propagate or transmit the computer program 46 as a computer data signal.

Although the memory circuitry 44 is illustrated as a single component in the figures it is to be appreciated that it may be implemented as one or more separate components some or all of which may be integrated/removable and/or may provide permanent/semi-permanent/dynamic/cached storage.

Although the processing circuitry 42 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures, Reduced Instruction Set Computing (RISC) and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

As illustrated in FIG. 10, the communication interface 27 may comprise an application specific integrated circuit (ASIC) 50. The ASIC 50 may comprise the controlling circuitry 28 and the transmission means 30. The ASIC 50 may comprise the controlling circuitry 28 on a first side 52, and the transmission means 30 on a second side 54 opposite the first side 52.

As discussed above, the apparatus 10 comprises engagement means 21 configured to releasably hold the apparatus 10 in engagement with the first electronic device 12 to establish the first physical communication link 23 between the apparatus 10 and the first electronic device 12. The engagement means 21 is also configured to releasably hold the apparatus 10 in engagement with the second electronic device 14 to establish the second physical communication link 25 between the apparatus 10 and the second electronic device 14.

FIG. 11 illustrates the process of engagement with a one of the first or second electronic devices 12, 14. The engagement means 21 may comprise a mating surface 54 configured to mate with a corresponding mating surface 56 on the respective first and second electronic devices 12, 14.

The mating surface 54 may comprise a formation 58 shaped to mate with a corresponding formation 60 on the first and second electronic devices 12, 14.

In the illustrated example, the formation 58 comprises an opening 62, which opening 62 comprises a magnet. The corresponding formation 60 comprises a projection 64 comprising a ferromagnetic material. The opening 62 is shaped to receive the projection 64. In such examples the projection 64 is releasably held in the opening 62 by a magnetic field to maintain the apparatus 10 in mating engagement with a one of the first or second electronic devices 12, 14. Accordingly, in such examples a magnetic field releasably holds the first or second electronic devices 12, 14 in engagement with the engagement mean 21. The engagement means 21 is therefore configured to releasably hold the apparatus 10 in engagement with the first or second electronic devices 12, 14 by a magnetic field.

In other examples, the engagement means 21 may be configured to releasably hold the apparatus 10 in engagement with the first and second electronic device 12, 14 by mechanical means. The mechanical means may include, but is not limited to, a friction fit or a mechanical coupling such as a latch or locking mechanism.

In some examples, the engagement means 21 does not comprise wires or small plug-in connectors and is therefore suitable for elderly users, and users which may have limited manual dexterity.

In some examples, the first and/or second electronic devices 12, 14 may comprise engagement means configured to releasably hold the apparatus 10 in engagement therewith. The engagement means of the first and/or second electronic devices 12, 14 may be configured to releasably hold the apparatus 10 in engagement therewith by mechanical means or by a magnetic field.

As illustrated in FIG. 12, the apparatus 10 may comprise protection circuitry 66 comprising a switch 68, wherein the switch 68 is configured to control electrical connection from the rechargeable battery 18 to the battery terminals 22, 24.

The switch 68 is configured such when the apparatus 10 is engaged with the first or second electronic devices 12, 14 the switch 68 connects the battery terminals 22, 24 enabling the rechargeable battery 18. The switch 68 is also configured such when the apparatus 10 is disengaged from the first or second electronic devices 12, 14 the switch 68 disconnects the battery terminals 22, 24 disabling the rechargeable battery 18.

The switch 68 may be operable by an applied magnetic field. The switch 68 may comprise a magnetic switch 68. The magnetic switch 68 may comprise a hall switch. The hall switch may comprise a hall effect sensor comprising switching circuitry. The switch 68 may comprise switching circuitry, which switching circuitry may comprise a field effect transistor, which may comprise a metal oxide semiconductor field effect transistor. Alternatively, the magnetic switch may comprise a reed switch.

In examples of the disclosure in which the engagement means 21 is configured to releasably hold the apparatus 10 in engagement with the first or second electronic devices 12, 14 by a magnetic field, the magnetic field causes the magnetic switch 68 to connect the battery terminals 22, 24. Accordingly, when the apparatus 10 is not engaged with the first or second electronic devices 12, 14 the absence of a magnetic field causes the magnetic switch 68 to disconnect the battery terminals 22, 24

FIG. 13, illustrates another example of the disclosure in which an apparatus 10 comprising a communication interface 27 and protection circuitry 66 is illustrated. In this example, the protection circuitry 66 comprises a magnetic switch 68, wherein the switch 68 is configured to control electrical connection from the rechargeable battery 18 to the battery terminals 22, 24. The communication interface 27 comprises controlling circuitry 28, the memory 16 and the real time clock 20. The transmission means 30 comprises a differential pair transmission line 36, wherein the line is configured to transmit and receive data as low voltage differential line coding. The transmission means 30 comprises two contacts 38, 40 for data transmission.

The apparatus 10 may be part of the Internet of Things forming part of a larger, distributed network.

FIG. 14 illustrates an apparatus 12 configured to be connectable to an electronic device 10. The apparatus 12 is configured to be releasably held by engagement means 21 of the electronic device 10 to establish a physical communication link 23 between the apparatus 12 and the electronic device 10. When held in engagement with the electronic device 10, the apparatus 12 is configured to: transmit data to the electronic device 10 via the physical communication link 23, receive current time data from the electronic device 10 via the physical communication link 23, and be powered by a rechargeable battery 18 of the electronic device 12.

The apparatus 12 may comprise the first electronic device 12 according to the above examples of the disclosure. Accordingly, references to apparatus 12 may also be references to the first electronic device 12. The electronic device 10 may comprise the apparatus 10 according to the above examples of the disclosure. Accordingly, references to electronic device 10 may also be references to the apparatus 10.

The apparatus 12 may be configured to be wearable by a subject. The apparatus 12 may be a smart watch. The apparatus 12 may be configured to monitor a measurable parameter, such as a physiological parameter of a subject. The apparatus 12 may comprise a cardiac monitor configured to monitor the electrical activity of the cardiovascular system, for instance the ECG heart activity. The apparatus 12 may therefore comprise at least one sensor 70. The cardiac monitor may comprise a Holter monitor. The apparatus 12 may comprise a user interface 72. The apparatus 12 may comprise a microcontroller unit 74. In some examples, the apparatus 12 does not comprise a real time clock 20. In some examples, the apparatus does not comprise GPS or RF circuitry.

FIG. 15 illustrates an apparatus 14 configured to be connectable to an electronic device 10. The apparatus 14 is configured to be releasably held by engagement means 21 of the electronic device 10 to establish a physical communication link 25 between the apparatus 14 and the electronic device 12. When held in engagement with the electronic device 10, the apparatus 14 is configured to: receive data from the electronic device 10 via the physical communication link 25, transmit the current time data to the electronic device 10 via the physical communication link 25, and to recharge a rechargeable battery 18 of the electronic device 10.

The apparatus 14 may comprise the second electronic device 14 according to the above examples of the disclosure. Accordingly, references to apparatus 14 may also be references to the second electronic device 14. The electronic device 10 may comprise the apparatus 10 according to the above examples of the disclosure. Accordingly, references to electronic device 10 may also be references to the apparatus 10.

The apparatus 14 comprises charging circuitry 76 for recharging the rechargeable battery 18. The charging circuitry 76 may comprise AC powered charging circuitry 76.

The apparatus 14 may comprise a communications interface 78 comprising controlling circuitry 80 configured to receive data from the memory 16 of the electronic device 10. The controlling circuitry 80 is also configured to transmit data to the electronic device 10. The data transmitted to the electronic device 10 may comprise device settings. The data transmitted to the electronic device 10 may comprise the current time.

The apparatus 14 may be configured to communicate with one or more remote devices. The data received by the apparatus 14 from the electronic device 10 may be stored in processed or unprocessed format remotely at one or more of the devices.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus 14 may comprise a radio transceiver for communication of data. The apparatus 14 therefore comprises wireless connectivity 81 (see FIG. 18). The apparatus 14 therefore comprises RF circuitry.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train an acyclic machine learning network such as a multilayer neural network or may be used as a query input to a machine learning network, which provides a response.

The figures also illustrate a system 100 according to examples of the disclosure comprising an apparatus 10 according to examples of the disclosure. As illustrated in FIG. 1, the apparatus 10 comprises: a memory 16, a rechargeable battery 18, a real time clock 20, and engagement means 21. The system 100 also comprises a first electronic device 12, and a second electronic device 14.

As illustrated in FIG. 2a, the engagement means 21 is configured to releasably hold the apparatus 10 in engagement with the first electronic device 12 to establish a first physical communication link 23 between the apparatus 10 and the first electronic device 12.

As illustrated in FIG. 2b, the engagement means 21 is configured to releasably hold the apparatus 10 in engagement with the second electronic device 14 to establish a second physical communication link 25 between the apparatus 10 and the second electronic device 14.

When held in engagement with the second electronic device 14, the apparatus 10 is configured to: receive current time data from the second electronic device 14 via the second physical communication link 25 for storage in the real time clock 20, and recharge the rechargeable battery 18 by the second electronic device 14.

When subsequently held in engagement with the first electronic device 12, the apparatus 10 is configured to: transmit the current time data to the first electronic device 12 via the first physical communication link 23, receive data collected by the first electronic device 12 via the first physical communication link 23 for storage in the memory 16, and power the first electronic device 12 with the rechargeable battery 18.

In some examples, when held in engagement with the second electronic device 14, the apparatus 10 is configured to transmit the received data collected by the first electronic device 12 to the second electronic device 14 via the second physical communication link 25.

As illustrated in FIG. 16, in some examples the system 100 comprises at least two apparatus 10a and 10b. In use, a first apparatus 10a may be powering the first electronic device 12 and storing data collected by the first electronic device 12 in the memory 16. Concurrently, the second apparatus 10b may be transmitting data stored in the memory 16 to the second electronic device 14, and the rechargeable battery 18 of the second apparatus 10b may be being recharged by the second electronic device 14. Accordingly, the first electronic device 10 may continue to operate using either the first apparatus 10a or the second apparatus 10b. The first electronic device 12 may therefore be operable continuously subject to the time taken to swap the first apparatus 10a with the second apparatus 10b. The first apparatus 10a may be replaced with the second apparatus 10b rapidly. Operation of the first electronic device 12 may therefore be essentially continuous.

FIG. 16 illustrates the condition of the first apparatus 10a and the second apparatus 10b as they are swapped in an example of the disclosure. The first apparatus 10a, has been engaged with the first electronic device 12. Accordingly, the rechargeable battery 18 is discharged and the memory 16 comprises recorded data. The second apparatus 10b, has been engaged with the second electronic device 14. Accordingly, the rechargeable battery 18 is fully charged, the memory 16 is empty and the real time clock 20 comprises the current time data.

As illustrated in FIG. 17, the system 100 may also comprise a remote device 82. The remote device 82 may for instance be one or more remote servers hosted on the Internet. A network of such remote servers is sometimes referred to as "The Cloud". The data from the second electronic device 14 may be transmitted to the remote device 82, and may be stored in the remote device 82. The second electronic device 14 may also be configured to receive data received from the remote device 82. The data received from the remote device 82 may comprise device settings. The data received from the remote device 82 may comprise the current time.

FIG. 18 illustrates another example system 100 of the disclosure, wherein the system comprises a remote device 82. In the illustrated example, the remote device 82 is The Cloud, which as noted above is a network of remote servers. In particular, FIG. 18 illustrates the possible communication of data and battery power in use between the first electronic device 12, the apparatus 10, and the second electronic device 14, and the communication of data in use between the second electronic device 14 and The Cloud 82. FIG. 18 illustrates an apparatus 10 comprising a memory 16, a rechargeable battery 18 and a real time clock 20. FIG. 18 illustrates a first electronic device 12 comprising at least one sensor 70, a user interface 72 and a microcontroller unit 74. FIG. 18 illustrates a second electronic device 14 comprising charging circuitry 76, controlling circuitry 80 and internet connectivity 81.

In use, the first electronic device 12 may transmit sensor data to the apparatus 10, i.e. data collected from the at least one sensor 70 via the first physical communication link 23. The apparatus 10 may transmit data relating to the current time and device settings to the first electronic device 12 via the first physical communication link 23. The apparatus 10 may transmit sensor data received from the first electronic device 12 to the second electronic device 14 via the second physical communication link 25. The second electronic device 14 may transmit current time and device settings to the apparatus 10 via the second physical communication link 25. The second electronic device 14 may transmit sensor data received from the apparatus 10 to The Cloud 82. The second electronic device 14 may receive current time and device settings from The Cloud 82. The apparatus 10 may power the first electronic device 12, and thus provide energy to the first electronic device 12. The second electronic device 14 may recharge the rechargeable battery 18 of the apparatus 10, and thus provide energy to the apparatus 10.

In some example of the disclosure, the apparatus 10 and the first electronic device 12 do not comprise RF circuitry. RF circuitry is not required because the apparatus 10 communicates with the respective first and second electronic devices 12, 14 via respective first and second physical communication links 23, 25. The absence of RF circuitry improves battery life and allows a more compact design of the apparatus 10 and first electronic device 12.

The system 100 may comprise any of the features described in any of the preceding statements or following description.

The system 100 according to examples of the disclosure may be used to monitor any measurable parameter, for example, a physiological parameter of a subject, environmental conditions such as air temperature, humidity, air quality, and audio signals. The first electronic device 12 may be configured to monitor a required parameter.

FIG. 19 illustrates a method. At block 84 the method comprises engaging with a first electronic device to establish a first physical communication link. At block 85 the method comprises engaging with a second electronic device to establish a second physical communication link. At block 86 the method comprises receiving current time data from the second electronic device via the second physical communication link. At block 87 the method comprises storing the received current time data in a real time clock. At block 88 the method comprises recharging a rechargeable battery by the second electronic device. At block 89 the method comprises transmitting the current time data to the first electronic device via the first physical communication link. At block 90 the method comprises receiving data collected by the first electronic device via the first physical communication link. At block 91 the method comprises storing the received data in a memory. At block 92 the method comprises powering the first electronic device with the rechargeable battery.

In some examples of the disclosure the method comprises transmitting the received data collected by the first electronic device to the second electronic device via the second physical communication link.

The method may comprise any of the features described in any of the preceding statements or following description.

FIG. 20 illustrates a method of manufacturing the apparatus 10 according to examples of the disclosure. At block 94 the method comprises configuring the apparatus 10 to be connectable to a first electronic device 12 and a second electronic device 14. At block 96, the method comprises providing the apparatus with a memory 16; a rechargeable battery 18; a real time clock 20; and engagement means 21.

The method of manufacturing the apparatus 10 may comprise any of the features described in any of the preceding statements or following description.

There is thus described and apparatus, system and method with a number of advantages as detailed above and as follows.

The apparatus, system and method according to examples of the disclosure permit large amounts of data to be transmitted and received. In systems 100 in which two apparatus 10 are provided, the apparatus 10 may comprise a relatively small rechargeable battery 18 because the two apparatus 10 may be swapped frequently. Accordingly, in examples in which the first electronic device 12 is a wearable device, in designing the wearable device the design would not need to accommodate an apparatus with a relatively large battery. Accordingly, the wearable device could be designed to increase user comfort.

Since the apparatus 10 comprises the battery 18, and not the first electronic device 12, the first electronic device 12 could be subject to more intensive cleaning, such as autoclave cleaning, when the first electronic device 12 is not connected to the apparatus 10.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that comprise some but not all of the instances in the class. It is therefore implicitly disclosed that a features described with reference to one example but not with reference to another example, can where possible be used in that other example but does not necessarily have to be used in that other example.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:
1. An apparatus comprising:
a memory;
a rechargeable battery;
a real time clock;
a temperature sensor; and an engagement portion configured to:
releasably hold the apparatus in engagement with a first electronic device that does not include a battery to establish a first physical communication link, between the apparatus and the first electronic device via a friction fit or a mechanical coupling comprising a latch mechanism or a locking mechanism; and
releasably hold the apparatus in engagement with a second electronic device to establish a second physical communication link, between the apparatus and the second electronic device via another friction fit or another mechanical coupling comprising a latch mechanism or a locking mechanism;
wherein the temperature sensor is configured to:
monitor a temperature of the rechargeable battery;
wherein the apparatus is configured to:
when the apparatus is held in engagement with the second electronic device, receive device setting data and time data from the second electronic device via the second physical communication link, transmit data associated with the temperature of the rechargeable battery to the second electronic device via the second physical communication link, and recharge the rechargeable battery by the second electronic device, wherein the received time data is for storage in the real time clock; and
when the apparatus is subsequently held in engagement with the first electronic device, after the apparatus is held in engagement with the second electronic device, transmit time data from the real time clock and the data associated with the temperature of the rechargeable battery to the first electronic device via the first physical communication link, transmit the device setting data to the first electronic device, via the first physical communication link, receive data collected by the first electronic device via the first physical communication link for storage in the memory, and power the first electronic device with the rechargeable battery of the apparatus.

2. An apparatus according to claim 1, wherein the apparatus comprises a communication interface configured to cause the apparatus to at least perform: communicating with the respective first and second electronic devices, wherein the communication interface comprises controlling circuitry, the memory and the real time clock.

3. An apparatus according to claim 2, wherein the controlling circuitry is configured to cause the apparatus to at least perform: receiving data from the first electronic device via the first physical communication link for storage in the memory, and transmitting data stored in the memory to the second electronic device via the second physical communication link.

4. An apparatus according to claim 2, wherein the controlling circuitry is configured to cause the apparatus to at least perform: receiving current time data from the second electronic device via the second physical communication link for storage in the real time clock, and transmitting the current time data to the first electronic device via the first physical communication link.

5. An apparatus according to claim 1, wherein the engagement portion comprises a mating surface configured to mate with a corresponding mating surface on the respective first and second electronic devices.

6. An apparatus according to claim 1, wherein the engagement portion is configured to releasably hold the apparatus in engagement with the first or second electronic devices by a magnetic field.

7. An apparatus according to claim 1, wherein the apparatus comprises protection circuitry comprising a magnetic switch, wherein the switch is configured to control electrical connection to battery terminals.

8. An apparatus according to claim 7, wherein the magnetic switch is configured such that when the apparatus is releasably held in engagement with the first or second electronic devices by a magnetic field, the switch connects the battery terminals enabling the rechargeable battery, wherein when the apparatus is disengaged from the first or second electronic devices the switch disconnects the battery terminals disabling the rechargeable battery.

9. An apparatus according to claim 1, wherein the apparatus does not comprise RF circuitry and the engagement portion does not comprise wires or small plug-in connectors.

10. An apparatus according to claim 1, wherein the second electronic device is further configured to:
when the apparatus is held in engagement with the second electronic device, receive a status of the rechargeable battery via the second physical communication link, wherein the rechargeable battery is recharged by the second electronic device responsive to the status indicating that the rechargeable battery is not fully charged.

11. An apparatus according to claim 1, wherein the first electronic device does not comprise a real time clock.

12. A system, the system comprising:
an apparatus, the apparatus comprising: a memory, a rechargeable battery, a real time clock, a temperature sensor, and an engagement portion;
a first electronic device that does not include a battery;
a second electronic device;
wherein the engagement portion is configured to:
releasably hold the apparatus in engagement with the first electronic device to establish a first physical communication link, between the apparatus and the first electronic device; and
releasably hold the apparatus in engagement with the second electronic device to establish a second physical communication link, between the apparatus and the second electronic device;
wherein the temperature sensor is configured to:
monitor a temperature of the rechargeable battery;
wherein the apparatus is configured to:
when the apparatus is held in engagement with the second electronic device, receive device setting data and time data from the second electronic device via the second physical communication link, transmit data associated with the temperature of the rechargeable battery to the second electronic device via the second physical communication link, and recharge the rechargeable battery by the second electronic device, wherein the received time data is for storage in the real time clock; and
when the apparatus is subsequently held in engagement with the first electronic device, after the apparatus is held in engagement with the second electronic device, transmit time data from the real time clock and the data associated with the temperature of the rechargeable battery to the first electronic device via the first physical communication link, transmit the device setting data to the first electronic device, via the first physical communication link, receive data collected by the first electronic device via the first physical communication link for storage in the memory, and power the first electronic device with the rechargeable battery of the apparatus.

13. A system according to claim 12, wherein the apparatus comprises protection circuitry comprising a magnetic switch, wherein the switch is configured to control electrical connection to battery terminals, and wherein the magnetic switch is configured such that when the apparatus is releasably held in engagement with the first or second electronic devices by a magnetic field, the switch connects the battery terminals enabling the rechargeable battery, wherein when the apparatus is disengaged from the first or second electronic devices the switch disconnects the battery terminals disabling the rechargeable battery.

14. A system according to claim 12, wherein the engagement portion does not comprise wires or small plug-in connectors.

15. A system according to claim 12, wherein the system comprises at least two apparatus including the apparatus, wherein a second apparatus of the at least two apparatus is configured to be held in engagement with one of the first electronic device or the second electronic device, while the apparatus is concurrently held in engagement with another of the first electronic device or the second electronic device.

16. A system according to claim 12, wherein the apparatus and the first electronic device do not comprise RF circuitry.

17. A non-transitory computer readable medium comprising program instructions for causing an apparatus to perform at least the following:
  determining an engagement of the apparatus with a first electronic device, that does not include a battery, and an establishment of a first physical communication link between the apparatus and the first electronic device;
  determining an engagement of the apparatus with a second electronic device and an establishment of a second physical communication link between the apparatus and the second electronic device;
  receiving device setting data, and current time data from the second electronic device via the second physical communication link;
  transmitting data associated with a temperature of a rechargeable battery of the apparatus to the second electronic device via the second physical communication link, wherein the data associated with the temperature of the rechargeable battery is collected from a temperature sensor of the apparatus that is configured to monitor the temperature of the rechargeable battery;
  storing the received current time data from the second electronic device in a real time clock;
  recharging the rechargeable battery of the apparatus by the second electronic device;
  when the apparatus is subsequently held in engagement with the first electronic device after the apparatus is held in engagement with the second electronic device, transmitting the device setting data, the current time data, and the data associated with the temperature of the rechargeable battery to the first electronic device via the first physical communication link, wherein the current time data is transmitted from the real time clock;
  receiving data collected by the first electronic device via the first physical communication link;
  storing the received data in a memory; and
  powering the first electronic device with the rechargeable battery of the apparatus.

18. A non-transitory computer readable medium as claimed in claim 17, further comprising program instructions for causing an apparatus to perform at least:
  communicating with the respective first and second electronic devices.

19. A non-transitory computer readable medium as claimed in claim 17, further comprising program instructions for causing an apparatus to perform at least: receiving data from the first electronic device via the first physical communication link for storage in the memory, and transmitting data stored in the memory to the second electronic device via the second physical communication link.

* * * * *